(12) United States Patent
Hayashi et al.

(10) Patent No.: US 7,424,939 B2
(45) Date of Patent: Sep. 16, 2008

(54) ROTARY DAMPER

(75) Inventors: Ken Hayashi, Aichi-gun (JP); Shunsuke Okabayashi, Toyota (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 128 days.

(21) Appl. No.: 11/287,286

(22) Filed: Nov. 28, 2005

(65) Prior Publication Data

US 2006/0113154 A1 Jun. 1, 2006

(30) Foreign Application Priority Data

Nov. 30, 2004 (JP) ............................. 2004-346493

(51) Int. Cl.
*F16D 57/00* (2006.01)

(52) U.S. Cl. .................... 188/290; 188/322.5

(58) Field of Classification Search ................. 188/290, 188/291, 292, 293, 294, 295, 296, 322.5, 188/82.1; 16/51, 52, 75, 82

See application file for complete search history.

(56) References Cited

U.S. PATENT DOCUMENTS

| | | | | |
|---|---|---|---|---|
| 6,561,323 | B2 * | 5/2003 | Machida | 188/293 |
| 6,662,683 | B1 * | 12/2003 | Takahashi et al. | 464/180 |
| 6,678,918 | B2 * | 1/2004 | Nakabayashi | 16/82 |
| 7,032,985 | B1 * | 4/2006 | Ichioka et al. | 312/319.2 |
| 2004/0035652 | A1 | 2/2004 | Arisaka | |
| 2005/0077130 | A1 | 4/2005 | Hayashi et al. | |
| 2005/0139691 | A1 * | 6/2005 | Seto et al. | 237/56 |

FOREIGN PATENT DOCUMENTS

| | | |
|---|---|---|
| GB | 2 246 186 | 1/1992 |
| GB | 2 253 891 | 9/1992 |
| GB | 2 286 869 | 8/1995 |
| GB | 2 416 198 | 1/2006 |
| JP | 09-072366 | 3/1997 |
| JP | 2603574 | 1/2000 |

* cited by examiner

*Primary Examiner*—Robert A. Siconolfi
*Assistant Examiner*—Vu Q Nguyen
(74) *Attorney, Agent, or Firm*—Manabu Kanesaka

(57) ABSTRACT

A rotary damper includes a driven-to-rotate member with a driven-to-rotate part for coupling to a drive member, a fixed support member for holding the driven-to-rotate member so as to rotate freely, a receiving part formed between the fixed support member and the driven-to-rotate member, a seal for sealing an outer perimeter of the receiving part so that the driven-to-rotate member and the fixed support member are capable of relative rotation, and a viscous fluid inside the receiving part for damping the relative rotation between the driven-to-rotate member and the fixed support member. The rotary damper is easy to assemble by virtue of eliminating the accumulation of unwanted air inside the receiving part. Since air does not mix with the viscous fluid, the torque precision can be made constant.

9 Claims, 9 Drawing Sheets

ROTARY DAMPER

BACKGROUND OF THE INVENTION AND RELATED ART STATEMENT

This invention relates to a rotary damper which damps relative rotation between a driven-to-rotate member and a fixed support member supporting this driven-to-rotate member to rotate freely, by viscosity resistance of a viscous fluid.

As the above-described rotary damper, for example, one that is constituted by a driven-to-rotate member which integrally has a driven-to-rotate part which couples to a drive member such as a gear or rack, a fixed support member which holds this driven-to-rotate member to rotate freely, an annular receiving part which is formed between this fixed support member and the driven-to-rotate member, a seal means which seals the outer perimeter of this receiving part so that the driven-to-rotate member and the fixed support member are capable of relative rotation, and a viscous fluid which is received inside the receiving part and damps relative rotation between the driven-to-rotate member and the fixed support member, is well known. See, for example, Japanese Patent No. 3421484.

The aforementioned conventional rotary damper, however, does not have a means for closing the inner perimeter of the receiving part during assembly, so that the viscous fluid will not leak while it is allowed to communicate with the atmosphere.

Accordingly, because of the accumulation of air in the conventional receiving part, the assembly characteristics become poor. In addition, air mixes into the viscous fluid and variation is caused in the torque, and the torque precision is no longer constant (i.e., torque irregularity is caused).

Accordingly, an object of the present invention is to eliminate undesirable characteristics those described above by providing a rotary damper which is easier to assemble by virtue of eliminating the accumulation of unwanted air inside the receiving part, and in which air no longer mixes into the viscous fluid so that the torque precision can be made constant.

Further objects and advantages of the invention will be apparent from the following description of the invention and the associated drawings.

SUMMARY OF THE INVENTION

According to one embodiment of the present invention, a rotary damper comprises: a driven-to-rotate member which integrally has a driven-to-rotate part which couples to a drive member; a fixed support member which holds this driven-to-rotate member to rotate freely; a receiving part which is formed between this fixed support member and said driven-to-rotate member; and a viscous fluid which is received inside this receiving part and damps relative rotation between said driven-to-rotate member and said fixed support member.

On said driven-to-rotate member, there is provided an inner cylindrical wall; on said fixed support member, there is provided an inner cylindrical wall which is inserted inside the inner cylindrical wall of said driven-to-rotate member to be capable of relative rotation; and there is provided a seal means which seals the outer perimeter of said receiving part so that said driven-to-rotate member and said fixed support member are capable of relative rotation.

According to another embodiment of the invention, a rotary damper comprises: a driven-to-rotate member which integrally has a driven-to-rotate part which couples to a drive member; a fixed support member which holds this driven-to-rotate member to rotate freely; a receiving part which is formed between this fixed support member and said driven-to-rotate member; and a viscous fluid which is received inside this receiving part and damps relative rotation between said driven-to-rotate member and said fixed support member.

There is provided a seal means which seals the outer perimeter of said receiving part so that said driven-to-rotate member and said fixed support member are capable of relative rotation; there is provided a second seal means which seals the space between the inner perimeter of the inner cylindrical wall of said driven-to-rotate member and the outer perimeter of the center shaft of said fixed support member which is inserted inside this inner cylindrical wall, so that said driven-to-rotate member and said fixed support member are capable of relative rotation; and on said inner cylindrical wall, there is provided a come-out prevention part which is deformed by heat to wrap around said second seal means and prevents said second seal means from coming out from between said inner cylindrical wall and the center shaft of said fixed support member.

According to another embodiment of the invention, a rotary damper comprises: a driven-to-rotate member which integrally has a driven-to-rotate part which couples to a drive member; a fixed support member which holds this driven-to-rotate member to rotate freely; a receiving part which is formed between this fixed support member and said driven-to-rotate member; and a viscous fluid which is received inside this receiving part and damps relative rotation between said driven-to-rotate member and said fixed support member.

There is provided a seal means which seals the outer perimeter of said receiving part so that said driven-to-rotate member and said fixed support member are capable of relative rotation; there is provided a second seal means which seals the space between the inner perimeter of the inner cylindrical wall of said driven-to-rotate member and the outer perimeter of the center shaft of said fixed support member which is inserted inside this inner cylindrical wall, so that said driven-to-rotate member and said fixed support member are capable of relative rotation.

By assembling said driven-to-rotate member and said fixed support member, this second seal means is held so as not to come out from between said inner cylindrical wall and said center shaft by a pressing projection provided on said inner cylindrical wall and a circumferential step part provided on said center shaft.

According to another embodiment of the invention, a rotary damper comprises: a driven-to-rotate member which integrally has a driven-to-rotate part which couples to a drive member; a fixed support member which holds this driven-to-rotate member to rotate freely; a receiving part which is formed between this fixed support member and said driven-to-rotate member; and a viscous fluid which is received inside this receiving part and damps relative rotation between said driven-to-rotate member and said fixed support member.

There is provided a seal means which seals the outer perimeter of said receiving part so that said driven-to-rotate member and said fixed support member are capable of relative rotation; there is provided a second seal means which seals the space between the inner perimeter of the inner cylindrical wall of said driven-to-rotate member and the outer perimeter of the center shaft of said fixed support member which is inserted inside this inner cylindrical wall, so that said driven-to-rotate member and said fixed support member are capable of relative rotation; and a coupling means which couples said driven-to-rotate member and said fixed support member to be capable of relative rotation is provided near said second seal means.

According to another embodiment of the invention, a rotary damper comprises: a driven-to-rotate member which integrally has a driven-to-rotate part which couples to a drive member; a fixed support member which holds this driven-to-rotate member to rotate freely; a receiving part which is formed between this fixed support member and said driven-to-rotate member; and a viscous fluid which is received inside this receiving part and damps relative rotation between said driven-to-rotate member and said fixed support member.

There is provided a seal means which seals the outer perimeter of said receiving part so that said driven-to-rotate member and said fixed support member are capable of relative rotation; there is provided a second seal means which seals the space between the outer perimeter of the inner cylindrical wall of said driven-to-rotate member and the inner perimeter of the inner cylindrical wall of said fixed support member into which this inner cylindrical wall is inserted, so that said driven-to-rotate member and said fixed support member are capable of relative rotation.

On at least one of the inner cylindrical wall of said driven-to-rotate member and said fixed support member, there is provided a come-out prevention part which is deformed by heat to wrap around said second seal means and prevents said second seal means from coming out from between the inner cylindrical wall of said driven-to-rotate member and the inner cylindrical wall of said fixed support member.

According to another embodiment of the invention, a rotary damper comprises: a driven-to-rotate member which integrally has a driven-to-rotate part which couples to a drive member; a fixed support member which holds this driven-to-rotate member to rotate freely; a receiving part which is formed between this fixed support member and said driven-to-rotate member; and a viscous fluid which is received inside this receiving part and damps relative rotation between said driven-to-rotate member and said fixed support member.

There is provided a seal means which seals the outer perimeter of said receiving part so that said driven-to-rotate member and said fixed support member are capable of relative rotation; there is provided a second seal means which seals the space between the outer perimeter of the inner cylindrical wall of said driven-to-rotate member and the inner perimeter of the inner cylindrical wall of said fixed support member into which this inner cylindrical wall is inserted, so that said driven-to-rotate member and said fixed support member are capable of relative rotation.

On the bottom surface part of said fixed support member, there is provided a come-out prevention part which is deformed by heat to wrap around said second seal means and prevents said second seal means from coming out from between the inner cylindrical wall of said driven-to-rotate member and the inner cylindrical wall of said fixed support member.

By this invention, because means (i.e., the inner cylindrical wall of the driven-to-rotate member, the inner cylindrical wall or center shaft of the fixed support member) for closing the inner perimeter of the receiving part on assembling while allowing it to communicate with the atmosphere are provided, it becomes easier to assemble without unwanted air accumulating inside the receiving part. In addition, air no longer mixes into the viscous fluid, and therefore, the torque precision can be made constant.

DETAILED DESCRIPTION OF THE PREFERRED EMBODIMENTS

Embodiments of the present invention will be explained below with reference to the accompanying drawings.

Figure 1:
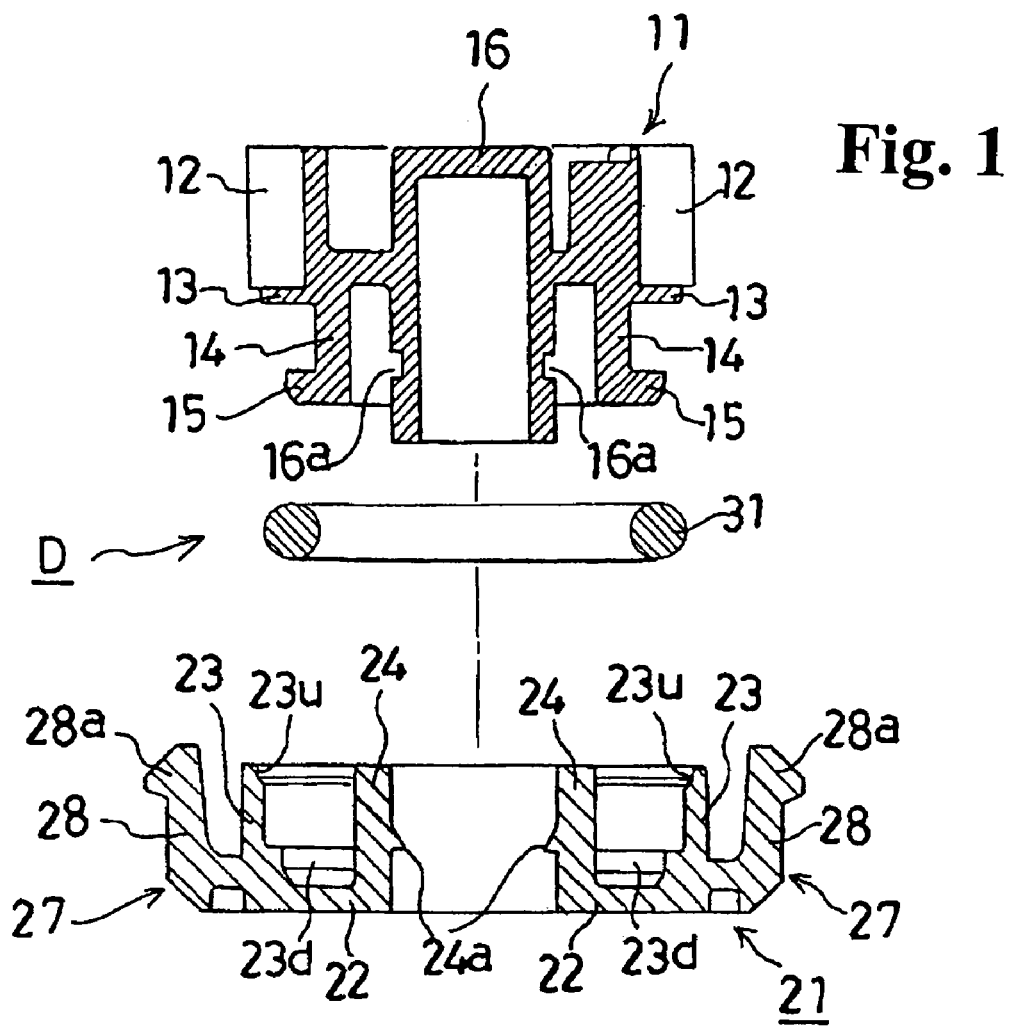
FIG. 1 is a disassembled front sectional view of a rotary damper according to a first embodiment of the invention.
Figure 2:
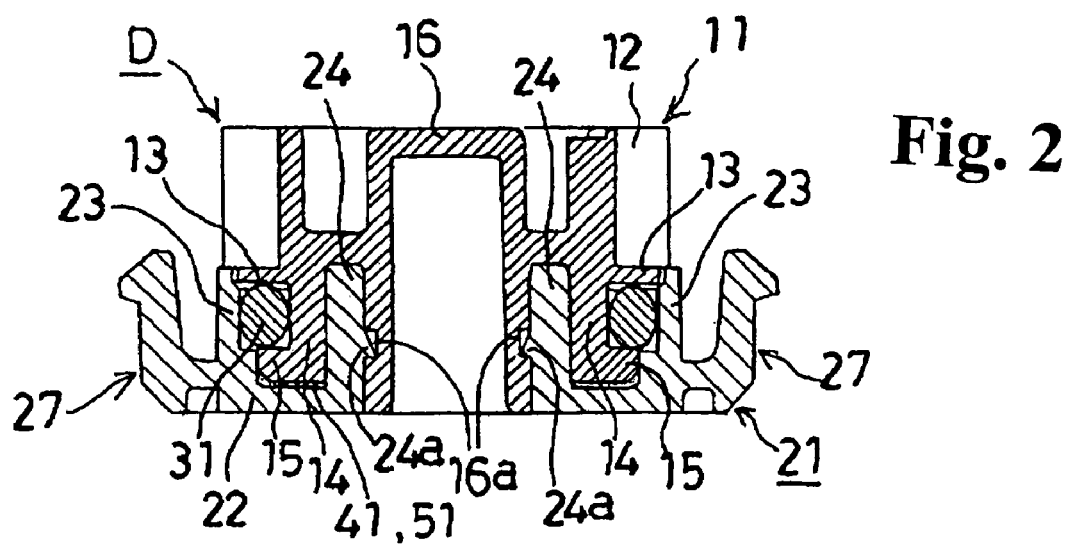
FIG. 2 is a front sectional view of the state in which the respective parts shown in FIG. 1 were assembled to make the rotary damper.

FIG. 1 is a disassembled front sectional view of a rotary damper according to a first embodiment of the invention, and FIG. 2 is a front sectional view of the state in which the respective parts shown in FIG. 1 were assembled to make the rotary damper.

In FIG. 1 and FIG. 2, D indicates the rotary damper, and it is constituted by: a driven-to-rotate member 11 made of synthetic resin; a fixed support member 21 made of synthetic resin, which holds this driven-to-rotate member 11 to rotate freely; an O-ring 31, for example, suitably formed with silicone rubber or EPDM (ethylene propylene diene monomer rubber), or the like, as a seal means (seal member), which is attached to the driven-to-rotate member 11, and seals the outer perimeter of an annular receiving part 41 which is formed between the driven-to-rotate member 11 and the fixed support member 21, so that the driven-to-rotate member 11 and the fixed support member 21 are capable of relative rotation; and a viscous fluid 51 such as grease or silicone oil, which is received inside the receiving part 41 formed between the driven-to-rotate member 11 and the fixed support member 21, and damps relative rotation of the driven-to-rotate member 11 and the fixed support member 21.

The above driven-to-rotate member 11, for example, is constituted by: a gear part 12 as a driven-to-rotate part which couples to a drive member such as a gear or a rack; a holding flange part 13 which is integrally provided beneath this gear part 12; an outer cylindrical wall 14 which is integrally provided beneath the holding flange part 13 centered on the center of the gear part 12; a holding flange part 15 which is integrally provided being placed opposite to the holding flange part 13 on the outer perimeter of the lower end of this outer cylindrical wall 14, and holds the O-ring 31 between it and the holding flange part 13 on the outer perimeter of the outer cylindrical wall 14; and an inner with-bottom cylindrical wall 16 (inner cylindrical wall with bottom) having a raised bottom, as an inner cylindrical wall which is integrally provided on the gear part 12 centered on the center of the gear part 12, and runs through vertically inside the outer cylindrical wall 14.

Also, on the outer perimeter on the lower side of the inner with-bottom cylindrical wall 16, there is provided a locking circumferential groove 16a having the lower end made as a flat surface, which forms a complementary coupling part capable of relative rotation with a coupling projection 24a of the fixed support member 21 to be described later.

The inner with-bottom cylindrical wall 16 is made with a length that does not project beneath a bottom wall 22 of the fixed support member 21 when the driven-to-rotate member 11 and the fixed support member 21 are assembled.

The above-mentioned fixed support member 21 is constituted by: a bottom wall 22 having a round ring shape viewed as a plane; an outer cylindrical wall 23 which is integrally provided on the outside edge of this bottom wall 22; an inner cylindrical wall 24 which is provided on the inside edge of the bottom wall 22 concentrically with the outer cylindrical wall 23, and is inserted into an annular groove formed by the outer cylindrical wall 14 and the inner with-bottom cylindrical wall 16 of the driven-to-rotate member 11; and attachment parts 27 which are integrally provided, for example at a 180° interval, on the outer perimeter of the bottom wall 22.

Also, on the outer cylindrical wall 23, a lower step part 23d which receives the holding flange part 15 of the driven-to-rotate member 11 to be capable of rotation inside it, is provided on the lower end on the inside, and an upper step part 23u which receives the holding flange part 13 of the driven-to-rotate member 11 to be capable of rotation inside it, is provided on the upper end on the inside.

Also, on the inner perimeter of the inner cylindrical wall 24, there are integrally formed coupling projections 24a, which form complementary coupling parts capable of relative rotation with the locking circumferential groove 16a of the driven-to-rotate member 11, and have the lower ends made as flat surfaces and have the upper sides made as sloping surfaces that descend downward as they go inward, and for example are positioned in the circumferential direction at a 180° interval, to a height corresponding to the locking circumferential groove 16a of the driven-to-rotate member 11.

Also, the attachment part 27 is constituted by: a holding piece 28 which extends upward after once extending downward from the bottom part 22 and has a holding claw 28a on the outside of the upper end; and a holding projection (not illustrated) which extends outward from the bottom part 22, and has a space for an attachment receiving member, for example an attachment receiving plate, which is held between it and the holding claw 28a.

Next, one example of assembly of the rotary damper D is explained.

First, as shown in FIG. 1, the fixed support member 21 is placed on top of a work table, and a prescribed quantity of viscous fluid 51 is poured into the annular recess formed between the outer cylindrical wall 23 and the inner cylindrical wall 24.

Also, the lower side of the driven-to-rotate member 11, with the O-ring 31 being held on the outside of the outer cylindrical wall 14 by the two holding flange parts 13 and 15, is inserted into the fixed support member 21 with the insertion of the inner with-bottom cylindrical wall 16 into the inner cylindrical wall 24 as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance into the space between the outer cylindrical wall 14 and the inner cylindrical wall 24.

By the fact that the air moves faster than the viscous fluid 51, it passes between the inner with-bottom cylindrical wall 16 and the inner cylindrical wall 24 from between the outer cylindrical wall 14 and the inner cylindrical wall 24, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, and the O-ring 31 seals the space between the outer cylindrical wall 23 and the outer cylindrical wall 14 so that the driven-to-rotate member 11 and the fixed support member 21 are capable of relative rotation.

Also, the lower side of the inner with-bottom cylindrical wall 16 rides over the coupling projections 24a and advances into the inner cylindrical wall 24, whereby the coupling projections 24a extend into the locking circumferential groove 16a, and the coupling projections 24a, as shown in FIG. 2, couple to the locking circumferential groove 16a. In addition, the upper end of the inner cylindrical wall 24 contacts with the driven-to-rotate member 11 and it becomes an assembly closing the inner perimeter of the receiving part 41, and the assembly (construction) is finished.

Next, the operation is explained.

First, when the driven-to-rotate member 11 rotates, the rotation of the driven-to-rotate member 11 is damped by the viscosity resistance and shear resistance of the viscous fluid 51 positioned between the driven-to-rotate member 11 and the fixed support member 21.

Accordingly, the rotation or movement of the gear, rack, or the like, to which the gear part 12 of the driven-to-rotate member 11 is engaged, is damped, and the gear, rack, or the like, is rotated or moved slowly.

As described above, by the first embodiment of this invention, because means (inner with-bottom cylindrical wall 16, inner cylindrical wall 24) for closing the inner perimeter of the receiving part 41 on assembling while allowing it to communicate with the atmosphere are provided, it becomes easier to assemble without unwanted air accumulating inside the receiving part 41, and in addition, air no longer mixes into the viscous fluid 51 and the torque precision can be made constant.

Also, because the inner perimeter of the receiving part 41 is closed by the driven-to-rotate member 11 and the inner cylindrical wall 24, as well as by the inner with-bottom cylindrical wall 16 and the inner cylindrical wall 24, the inner perimeter of the receiving part 41 can be closed, and the viscous fluid 51 can be prevented from leaking from the receiving part 41, without separately preparing a closing member.

Furthermore, because complementary coupling parts (locking circumferential groove 16a, coupling projections 24a) as coupling parts (coupling means), which restrict movement in the direction of the axis of rotation of the relative rotation of the driven-to-rotate member 11 and the fixed support member 21, and with which the driven-to-rotate member 11 and the fixed support member 21 are capable of relative rotation, are provided between the outer perimeter of the inner with-bottom cylindrical wall 16 and the inner perimeter of the inner cylindrical wall 24, it becomes harder for the driven-to-rotate member 11 to come out from the fixed support member 21. Also, by the fact that the driven-to-rotate member 11 and the fixed support member 21 contact in the center part where there is little contact area, the frictional resistance between the driven-to-rotate member 11 and the fixed support member 21 becomes less, and in addition, by the fact that the viscous fluid 51 enters between the driven-to-rotate member 11 and the fixed support member 21, the frictional resistance between the driven-to-rotate member 11 and the fixed support member 21 becomes even less.

Also, because the holding flange part 15 was provided on the outer cylindrical wall 14, the assembly operation can be performed with good operability by the fact that the O-ring 31 no longer falls off from the outer cylindrical wall 14.

Figure 3:
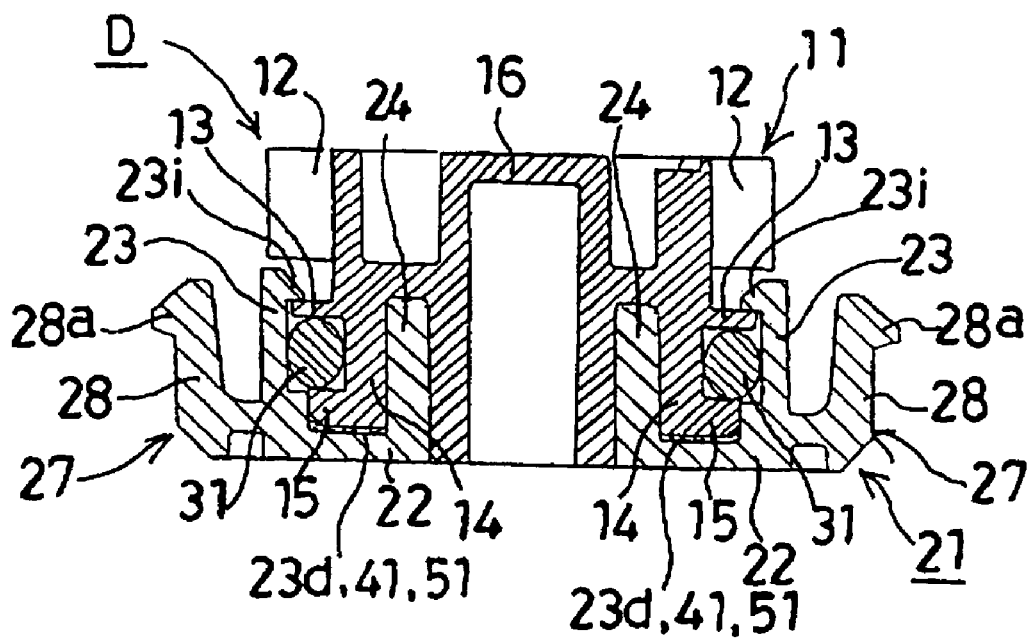
FIG. 3 is a front sectional view of a rotary damper according to a second embodiment of the invention.

FIG. 3 is a front sectional view of a rotary damper according to a second embodiment of the invention. The same reference characters are assigned to the same or comparable parts as in FIG. 1 or FIG. 2, and their explanations are omitted.

In FIG. 3, 12 indicates a gear part, and a prescribed interval is provided between its own teeth and the holding flange part 13 so that a coupling claw 23i of an outer cylindrical wall 23 to be described later can pass through.

A coupling claw 23i is provided on the inside of the upper end of the outer cylindrical wall 23, being made to project inward with the upper side made as a slope that descends inward, and they are provided in the circumferential direction at a prescribed interval, for example, four separated by 90°, so as to couple to the upper surface of the holding flange part 13 of the driven-to-rotate member 11 to be capable of rotation.

The above-mentioned holding flange part 13 and coupling claw 23I constitute a coupling part which couples the driven-to-rotate member 11 and the fixed support member 21 to be capable of relative rotation.

The other parts of the rotary damper D of this second embodiment are constituted the same as in the first embodiment, except for the point that a locking circumferential groove is not provided on the inner with-bottom cylindrical wall 16, the point that an upper step part is not provided on the outer cylindrical wall 23, and the point that a coupling projection is not provided on the inner cylindrical wall 24.

Next, one example of assembly of the rotary damper D is explained.

First, as shown in FIG. 1, the fixed support member 21 is placed on top of a work table, and a prescribed quantity of viscous fluid 51 is poured into the annular recess formed between the outer cylindrical wall 23 and the inner cylindrical wall 24.

Also, the lower side of the driven-to-rotate member 11, with the O-ring 31 being held on the outside of the outer cylindrical wall 14 by the two holding flange parts 13 and 15, is inserted into the fixed support member 21 with the insertion of the inner with-bottom cylindrical wall 16 into the inner cylindrical wall 24 as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance into the space between the outer cylindrical wall 14 and the inner cylindrical wall 24.

By the fact that the air moves faster than the viscous fluid 51, it passes between the inner with-bottom cylindrical wall 16 and the inner cylindrical wall 24 from between the outer cylindrical wall 14 and the inner cylindrical wall 24, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, the O-ring 31 seals the space between the outer cylindrical wall 23 and the outer cylindrical wall 14 so that the driven-to-rotate member 11 and the fixed support member 21 are capable of relative rotation, and the coupling claws 23i spread open and ride over the holding flange part 13 and then close in, whereby they are coupled to the upper surface of the holding flange part 13 to be capable of rotation.

Also, the lower side of the inner with-bottom cylindrical wall 16 advances into the inner cylindrical wall 24, and as shown in FIG. 3, the upper end of the inner cylindrical wall 24 contacts with the driven-to-rotate member 11 and it becomes an assembly closing the inner perimeter of the receiving part 41, and the assembly (construction) is finished.

Because the operation of the rotary damper D in this second embodiment becomes the same as in the first embodiment, the explanation is omitted.

By the second embodiment of this invention, although the coupling means (coupling part) for coupling the driven-to-rotate member 11 and the fixed support member 21 to be capable of relative rotation is constituted by a part of the holding flange part 13 and the coupling claws 23i, which are positioned outside the receiving part 41, the same kind of effect as in the first embodiment can be obtained.

Figure 4:
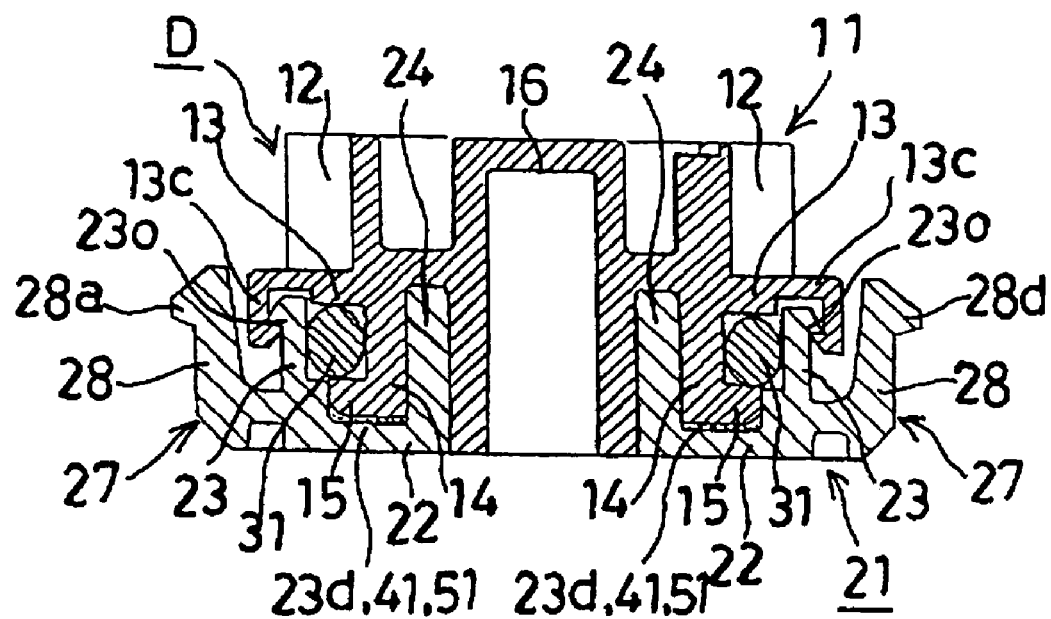
FIG. 4 is a front sectional view of a rotary damper according to a third embodiment of the invention.

FIG. 4 is a front sectional view of a rotary damper according to a third embodiment of the invention. The same reference characters are assigned to the same or comparable parts as in FIG. 1-FIG. 3, and their explanations are omitted.

In FIG. 4, 13c indicates a coupling claw, and they are provided on the outside edge of the holding flange part 13 in the circumferential direction at a prescribed interval, for example, four separated by 90°, being L-shaped extending downward after once extending outward, and the inside of the lower end being made as a slope spreading open downward from the upper side, so as to couple to a circumferential locking part 23o of the outer cylindrical wall 23 to be described later.

A circumferential locking part 23o is provided encircling on the outside of the upper end of the outer cylindrical wall 23, being made to project outward with the upper side being made as a sloping surface that descends going outward, so that the coupling claws 13c of the holding flange part 13 of the driven-to-rotate member 11 couple to the lower surface to be capable of rotation.

The above-mentioned coupling claw 13c and circumferential locking part 23o constitute a coupling part which couples the driven-to-rotate member 11 and the fixed support member 21 to be capable of relative rotation.

The other parts of the rotary damper D of this third embodiment are constituted the same as in the first embodiment, except for the point that a locking circumferential groove is not provided on the inner with-bottom cylindrical wall 16, the point that an upper step part is not provided on the outer cylindrical wall 23, and the point that a coupling projection is not provided on the inner cylindrical wall 24.

Next, one example of assembly of the rotary damper D is explained.

First, as shown in FIG. 1, the fixed support member 21 is placed on top of a work table, and a prescribed quantity of viscous fluid 51 is poured into the annular recess formed between the outer cylindrical wall 23 and the inner cylindrical wall 24.

Also, the lower side of the driven-to-rotate member 11, with the O-ring 31 being held on the outside of the outer cylindrical wall 14 by the two holding flange parts 13 and 15, is inserted into the fixed support member 21 with the insertion of the inner with-bottom cylindrical wall 16 into the inner cylindrical wall 24 as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance into the space between the outer cylindrical wall 14 and the inner cylindrical wall 24.

By the fact that the air moves faster than the viscous fluid 51, it passes between the inner with-bottom cylindrical wall 16 and the inner cylindrical wall 24 from between the outer cylindrical wall 14 and the inner cylindrical wall 24, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, the O-ring 31 seals the space between the outer cylindrical wall 23 and the outer cylindrical wall 14 so that the driven-to-rotate member 11 and the fixed support member 21 are capable of relative rotation, and the coupling claws 13c spread open and ride over the circumferential locking part 23o and then close in, whereby they are coupled to the lower surface of the circumferential locking part 23o to be capable of rotation.

Also, the lower side of the inner with-bottom cylindrical wall 16 advances into the inner cylindrical wall 24, and as shown in FIG. 4, the upper end of the inner cylindrical wall 24 contacts with the driven-to-rotate member 11 and it becomes an assembly closing the inner perimeter of the receiving part 41, and the assembly (construction) is finished.

Because the operation of the rotary damper D in this third embodiment becomes the same as in the first embodiment, the explanation is omitted.

By the third embodiment of this invention, although the coupling means (coupling part) for coupling the driven-to-rotate member 11 and the fixed support member 21 to be capable of relative rotation is constituted by the coupling claws 13c and the circumferential locking part 23o, which are positioned on the outside of the receiving part 41, the same kind of effect as in the first embodiment can be obtained.

Figure 5:
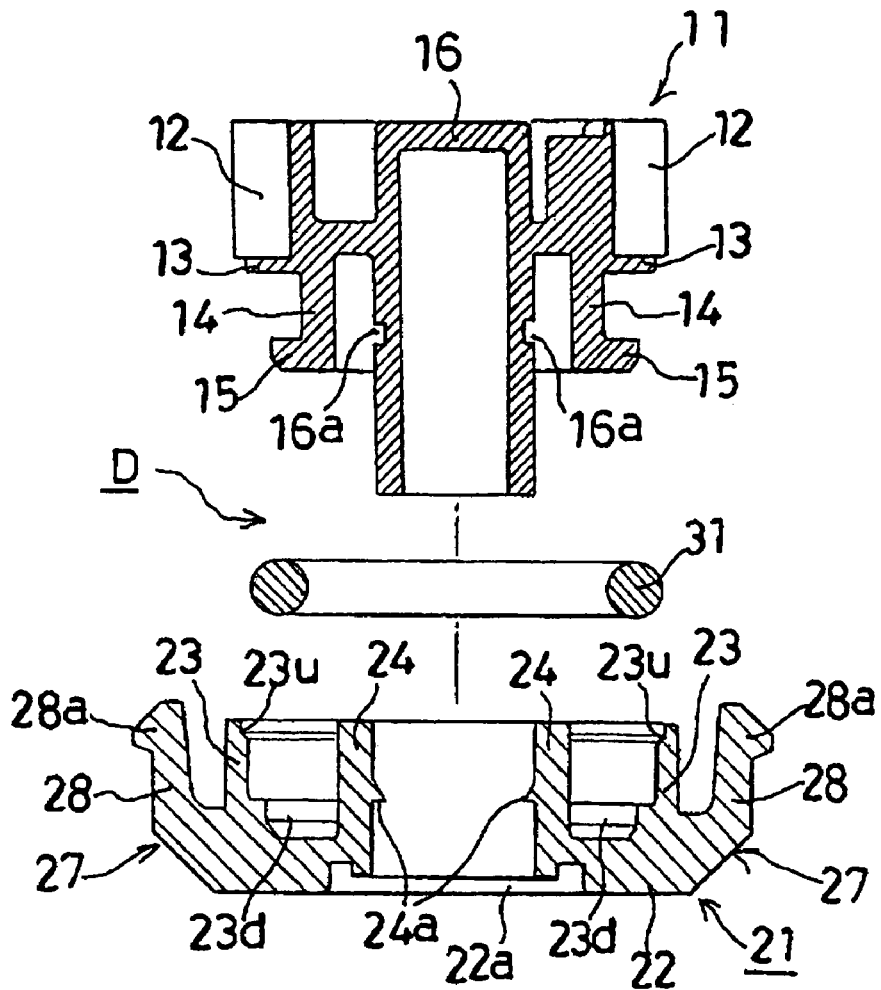
FIG. 5 is a disassembled front sectional view of a rotary damper according to a fourth embodiment of the invention.
Figure 6:
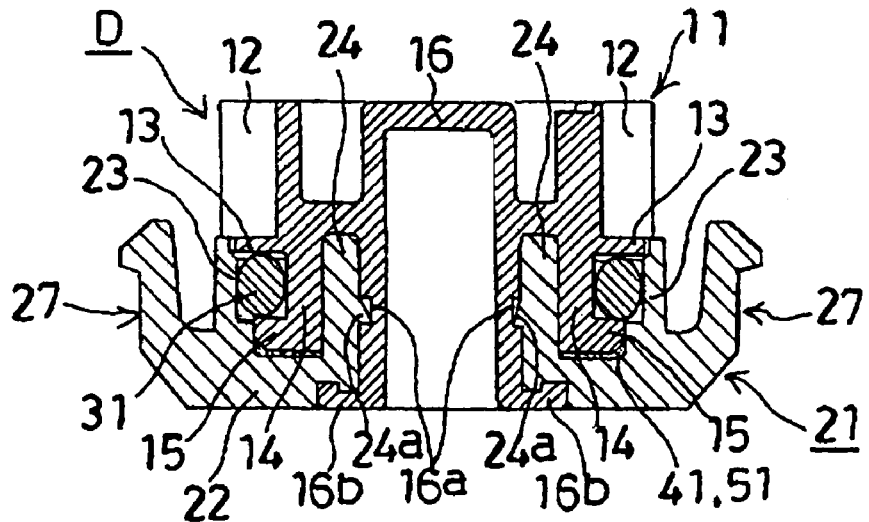
FIG. 6 is a front sectional view of the state in which the respective parts shown in FIG. 5 were assembled to make the rotary damper.

FIG. 5 is a disassembled front sectional view of a rotary damper according to a fourth embodiment of the invention, and FIG. 6 is a front sectional view of the state in which the respective parts shown in FIG. 5 were assembled to make the rotary damper. The same reference characters are assigned to the same or comparable parts as in FIG. 1-FIG. 4, and their explanations are omitted.

In FIG. 5 and FIG. 6, 22a indicates a circumferential recess which constitutes a coupling part for coupling the driven-to-rotate member 11 and the fixed support member 21 to be capable of relative rotation. It is provided on the outside of the bottom wall 22 being centered on the center of the inner cylindrical wall 24 (the center of the bottom wall 22), and an outer circumferential deep recess part one level deeper is provided on the outside.

The inner with-bottom cylindrical wall 16 is made with a length that does not project beneath the bottom wall 22 of the fixed support member 21 when the driven-to-rotate member 11 and the fixed support member 21 are assembled.

Also, the lower end part of the inner with-bottom cylindrical wall 16 is caused to be deformed by heat toward the inside of the circumferential recess 22a as described later to become a locking part 16b, and this locking part 16b, together with the circumferential recess 22a, constitutes a coupling part for coupling the driven-to-rotate member 11 and the fixed support member 21 to be capable of relative rotation.

The other parts of the rotary damper D of this fourth embodiment are constituted the same as in the first embodiment.

Next, one example of assembly of the rotary damper D is explained.

First, as shown in FIG. 5, the fixed support member 21 is placed on top of a work table, and a prescribed quantity of viscous fluid 51 is poured into the annular recess formed between the outer cylindrical wall 23 and the inner cylindrical wall 24.

Also, the lower side of the driven-to-rotate member 11, with the O-ring 31 being held on the outside of the outer cylindrical wall 14 by the two holding flange parts 13 and 15, is inserted into the fixed support member 21 with the insertion of the inner with-bottom cylindrical wall 16 into the inner cylindrical wall 24 as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance into the space between the outer cylindrical wall 14 and the inner cylindrical wall 24.

By the fact that the air moves faster than the viscous fluid 51, it passes between the inner with-bottom cylindrical wall 16 and the inner cylindrical wall 24 from between the outer cylindrical wall 14 and the inner cylindrical wall 24, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, and the O-ring 31 seals the space between the outer cylindrical wall 23 and the outer cylindrical wall 14 so that the driven-to-rotate member 11 and the fixed support member 21 are capable of relative rotation.

Also, the lower side of the inner with-bottom cylindrical wall 16 rides over the coupling projections 24a and advance into the inner cylindrical wall 24, whereby the coupling projections 24a extend into the locking circumferential groove 16a, and the coupling projections 24a, as shown in FIG. 6, couple to the locking circumferential groove 16a.

In this state, for example, a heat tip heated by passing electric current is pressed against the lower side of the inner with-bottom cylindrical wall 16 to cause it to be deformed outward, and as shown in FIG. 6, the lower side of the inner with-bottom cylindrical wall 16 is caused to be received inside the circumferential recess 22a to provide the locking part 16b, whereby the assembly (construction) is finished.

Because the operation of the rotary damper D in this fourth embodiment becomes the same as in the first embodiment, the explanation is omitted.

By the fourth embodiment of this invention, the same kind of effect as in the first embodiment can be obtained.

Also, because the locking part 16b can be provided by causing the lower side of the inner with-bottom cylindrical wall 16 to be deformed with heat in a state having coupled the coupling projections 24a to the circumferential groove 16a, the work of providing the locking part 16b by causing the lower side of the inner with-bottom cylindrical wall 16 to be deformed by heat can be performed with good workability.

Figure 7:
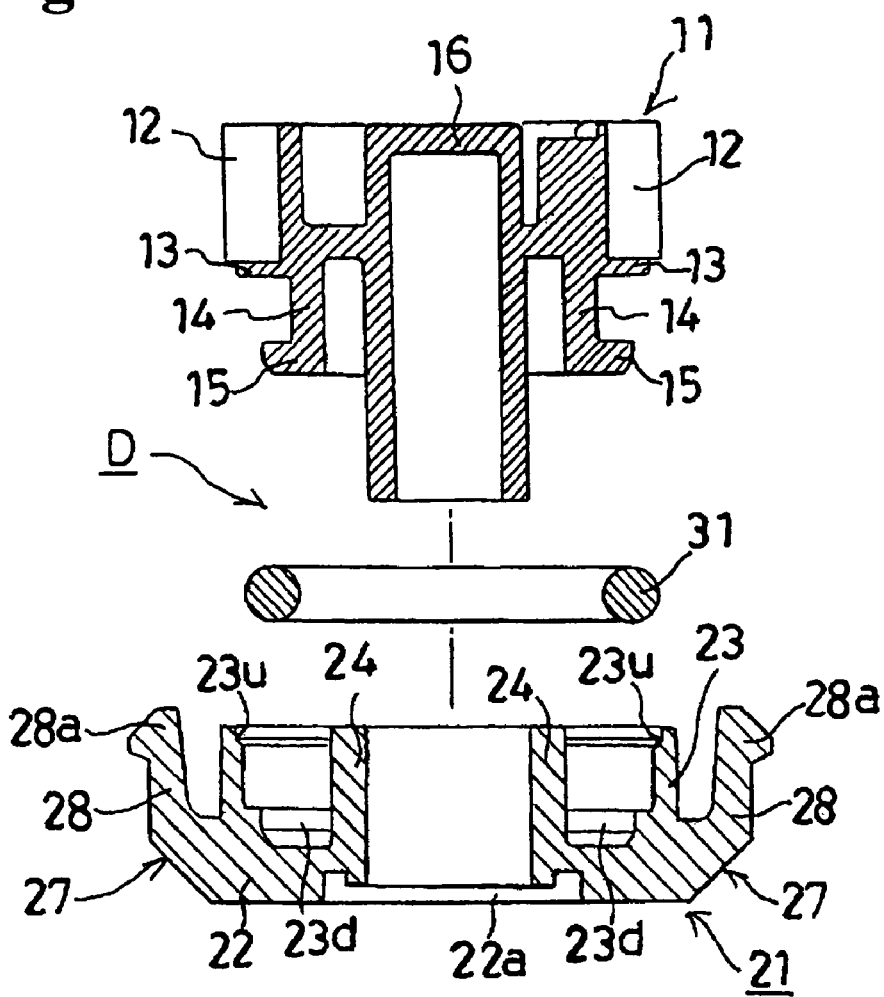
FIG. 7 is a disassembled front sectional view of a rotary damper according to a fifth embodiment of the invention.
Figure 8:
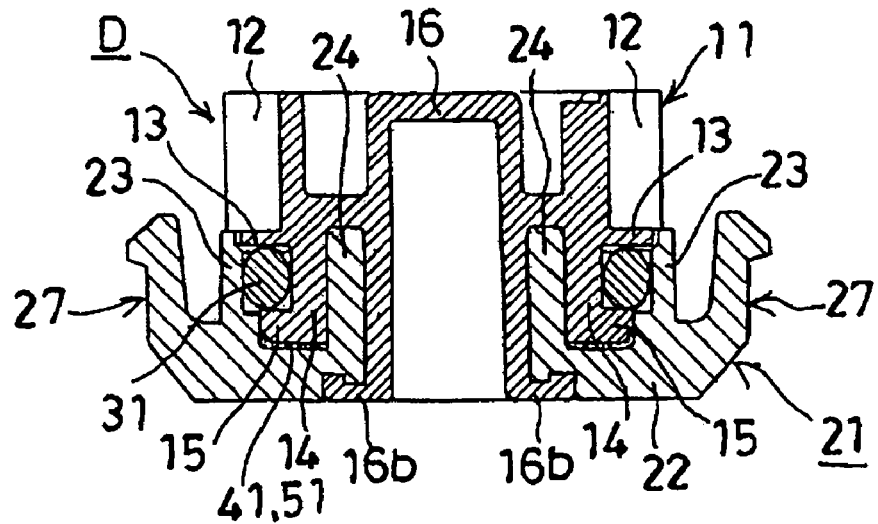
FIG. 8 is a front sectional view of the state in which the respective parts shown in FIG. 7 were assembled to make the rotary damper.

FIG. 7 is a disassembled front sectional view of a rotary damper according to a fifth embodiment of the invention, and FIG. 8 is a front sectional view of the state in which the respective parts shown in FIG. 7 were assembled to make the rotary damper. The same reference characters are assigned to the same or comparable parts as in FIG. 1-FIG. 6, and their explanations are omitted.

The rotary damper D of this fifth embodiment is constituted the same as in the fourth embodiment, except for the point that a locking circumferential groove is not provided on the inner with-bottom cylindrical wall 16, and the point that the coupling projections are not provided on the inner cylindrical wall 24.

Because one example of assembly in this fifth embodiment becomes the same as in the fourth embodiment, its explanation is omitted.

Also, because the operation in this fifth embodiment becomes the same as in the first embodiment, the explanation is omitted.

By this fifth embodiment, the same kind of effect as in the first embodiment can be obtained.

Figure 9:
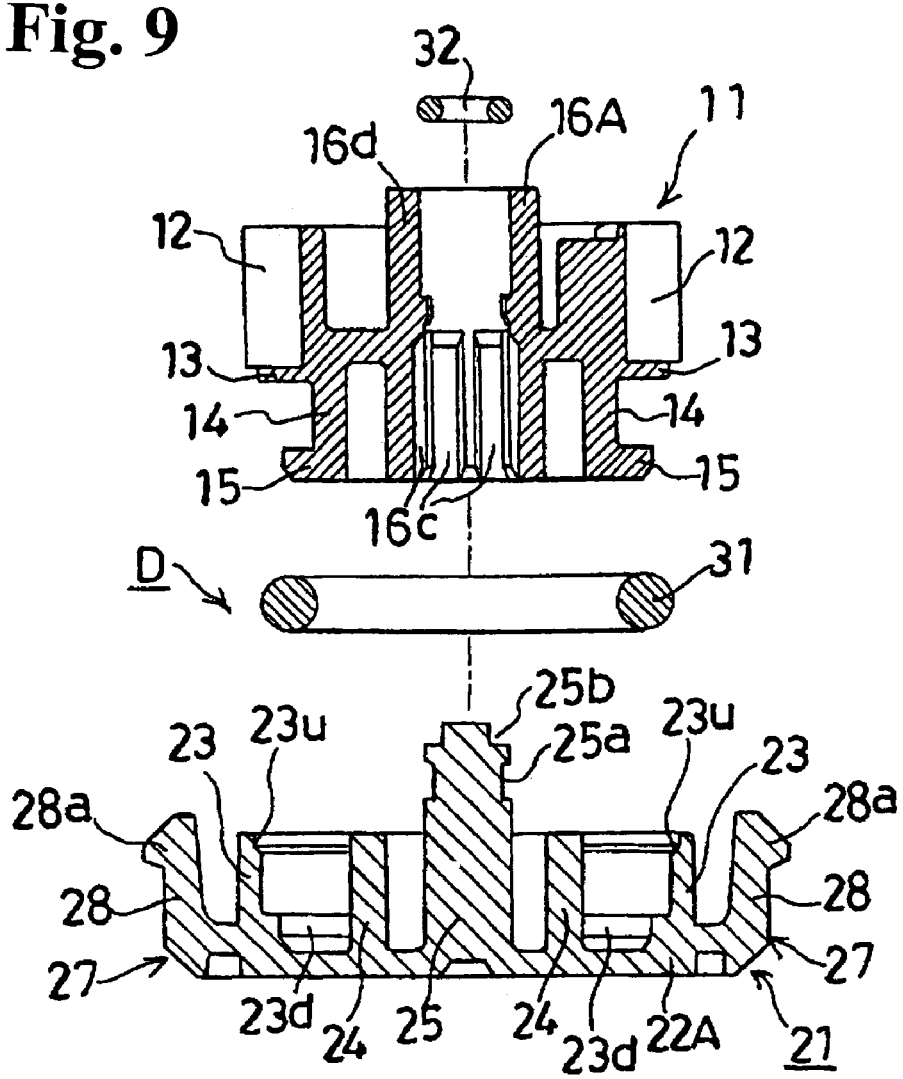
FIG. 9 is a disassembled front sectional view of a rotary damper according to a sixth embodiment of the invention.
Figure 10:
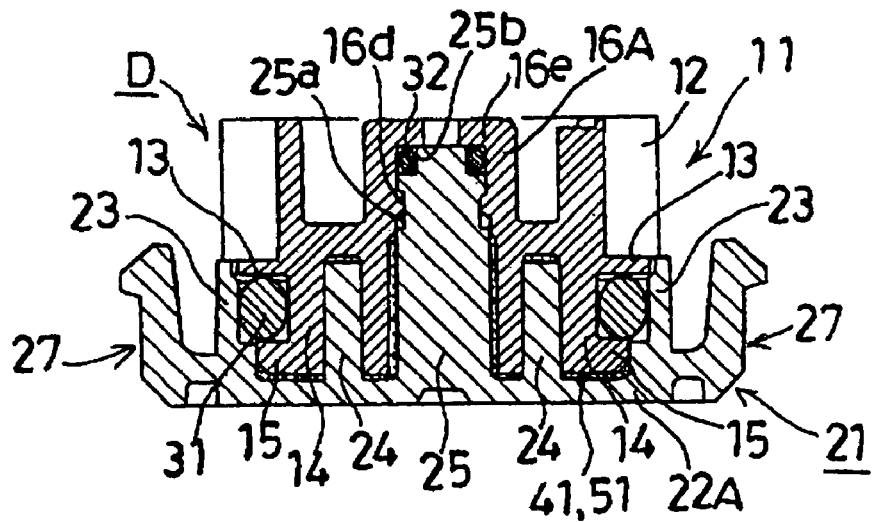
FIG. 10 is a front sectional view of the state in which the respective parts shown in FIG. 9 were assembled to make the rotary damper.

FIG. 9 is a disassembled front sectional view of a rotary damper according to a sixth embodiment of the invention, and FIG. 10 is a front sectional view of the state in which the respective parts shown in FIG. 9 were assembled to make the rotary damper. The same reference characters are assigned to the same or comparable parts as in FIG. 1-FIG. 8, and their explanations are omitted.

In FIG. 9 and FIG. 10, D indicates the rotary damper, and it is constituted by: a driven-to-rotate member 11 made of synthetic resin; a fixed support member 21 made of synthetic resin, which holds this driven-to-rotate member 11 to rotate freely; an O-ring 31, for example, suitably formed with silicone rubber or EPDM (ethylene propylene diene monomer rubber), or the like, as a seal means (seal member), which is attached to the driven-to-rotate member 11, and seals the outer perimeter of an annular receiving part 41 which is formed between the driven-to-rotate member 11 and the fixed support member 21, so that the driven-to-rotate member 11 and the fixed support member 21 are capable of relative rotation; an O-ring 32, for example, suitably formed with silicone rubber or EPDM (ethylene propylene diene monomer rubber), or the like, as a seal means (seal member), which seals the space between the inner perimeter of an inner cylindrical wall 16A of the driven-to-rotate member 11 and the outer perimeter of a center shaft 25 of the fixed support member 21 which is inserted inside this inner cylindrical wall 16A, so that the driven-to-rotate member 11 and the fixed support member 21 are capable of relative rotation; and a viscous fluid 51 such as grease or silicone oil, which is received inside the receiving part 41 formed between the driven-to-rotate member 11 and the fixed support member 21, and damps relative rotation of the driven-to-rotate member 11 and the fixed support member 21.

The above driven-to-rotate member 11, for example, is constituted by: a gear part 12 as a driven-to-rotate part which couples to a drive member such as a gear or a rack; a holding flange part 13 which is integrally provided beneath this gear part 12; an outer cylindrical wall 14 which is integrally provided beneath the holding flange part 13 centered on the center of the gear part 12; a holding flange part 15 which is integrally provided being placed opposite to the holding flange part 13 on the outer perimeter of the lower end of this outer cylindrical wall 14, and holds the O-ring 31 between it and the holding flange part 13 on the outer perimeter of the outer cylindrical wall 14; and an inner cylindrical wall 16A which is integrally provided on the gear part 12 centered on the center of the gear part 12, runs through vertically inside the outer cylindrical wall 14, and has an opening that communicates with the receiving part 41.

Also, on the inner perimeter of the inner cylindrical wall 16A, there are integrally provided: grooves 16c, for example six at equal intervals of 60°, which extend from the lower end to the middle part in the vertical direction; and coupling projections 16d, which are positioned above these grooves 16c, and form complementary coupling parts capable of relative rotation with a locking circumferential groove 25a of the fixed support member 21 to be described later, and have the upper ends made as flat surfaces and have the lower sides made as sloping surfaces which spread outward as they go downward, and for example are positioned in the circumferential direction at a 180° interval.

The inner cylindrical wall 16A is made with a length that does not project above the center shaft 25 of the fixed support member 21 when the driven-to-rotate member 11 and the fixed support member 21 are assembled.

Also, the upper end part of the inner cylindrical wall 16A is caused to be deformed by heat inward as described later to become a come-out prevention part 16e, which prevents the O-ring 32 from coming out from between the inner cylindrical wall 16A and the center shaft 25.

The above-mentioned fixed support member 21 is constituted by: a bottom wall 22A having a circular shape viewed as a plane; an outer cylindrical wall 23 which is integrally provided on the outside edge of this bottom wall 22A; an inner cylindrical wall 24 which is provided on the bottom wall 22A concentrically with the outer cylindrical wall 23, and is inserted into an annular groove formed by the outer cylindrical wall 14 and the inner cylindrical wall 16A of the driven-to-rotate member 11; a center shaft 25 which is integrally provided in the center of the bottom wall 22A and is inserted into the inner cylindrical wall 16A of the driven-to-rotate member 11; and attachment parts 27 which are integrally provided, for example at a 180° interval, on the outer perimeter of the bottom wall 22A.

Also, on the center shaft 25, there is provided a locking circumferential groove 25a having the upper end made as a flat surface, which forms a complementary coupling part capable of relative rotation with the coupling projection 16d of the driven-to-rotate member 11, to the height of the outer perimeter corresponding to the coupling projection 16d of the driven-to-rotate member 11, and on the outside of the upper end, there is provided a circumferential step part 25b as a receiving part for receiving the O-ring 32.

Next, one example of assembly of the rotary damper D is explained.

First, as shown in FIG. 9, the fixed support member 21 is placed on top of a work table, and a prescribed quantity of viscous fluid 51 is poured into the annular recess formed between the outer cylindrical wall 23 and the inner cylindrical wall 24.

Also, the lower side of the driven-to-rotate member 11, with the O-ring 31 being held on the outside of the outer cylindrical wall 14 by the two holding flange parts 13 and 15, is inserted into the fixed support member 21 with the insertion of the center shaft 25 into the inner cylindrical wall 16A as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance through the grooves 16c into the space between the inner cylindrical wall 16A and the center shaft 25.

By the fact that the air moves faster than the viscous fluid 51, it passes between the outer cylindrical wall 14 and the inner cylindrical wall 24, between the two inner cylindrical walls 16A and 24, and between the inner cylindrical wall 16A and the center shaft 25 from the grooves 16c, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, and the O-ring 31 seals the space between the outer cylindrical wall 23 and the outer cylindrical wall 14 so that the driven-to-rotate member 11 and the fixed support member 21 are capable of relative rotation.

Also, the center shaft 25 rides over the coupling projections 16d and advances into the inner cylindrical wall 16A, whereby the coupling projections 16d extend into the locking circumferential groove 25a, and the coupling projections 16d, as shown in FIG. 10, couple to the locking circumferential groove 25a.

Also, the O-ring 32 is inserted from above into the inner cylindrical wall 16A, and the O-ring 32 is positioned inside the circumferential step part 25b.

In this state, for example, a heat tip heated by passing electric current is pressed against the upper side of the inner cylindrical wall 16A to cause it to be deformed inward, and as shown in FIG. 10, the come-out prevention part 16e for preventing the O-ring 32 from coming out from between the inner cylindrical wall 16A and the center shaft 25 is provided, whereby the assembly (construction) is finished.

Because the operation of the rotary damper. D in this sixth embodiment becomes the same as in the first embodiment, the explanation is omitted.

By the sixth embodiment of this invention, the same kind of effect as in the first embodiment can be obtained.

Also, the coupling means for coupling the driven-to-rotate member 11 and the fixed support member 21 to be capable of relative rotation in this embodiment also may have the constitution of the embodiment in FIG. 3 or FIG. 4.

Figure 11:
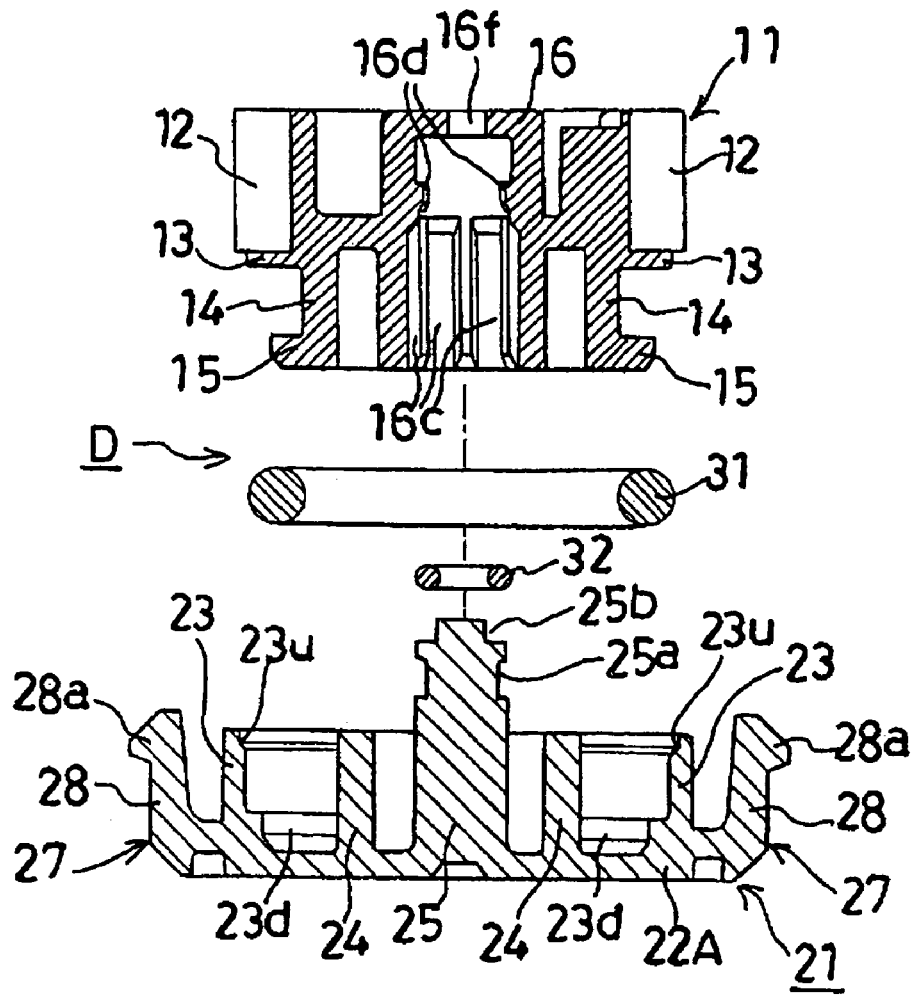
FIG. 11 is a disassembled front sectional view of a rotary damper according to a seventh embodiment of the invention.
Figure 12:
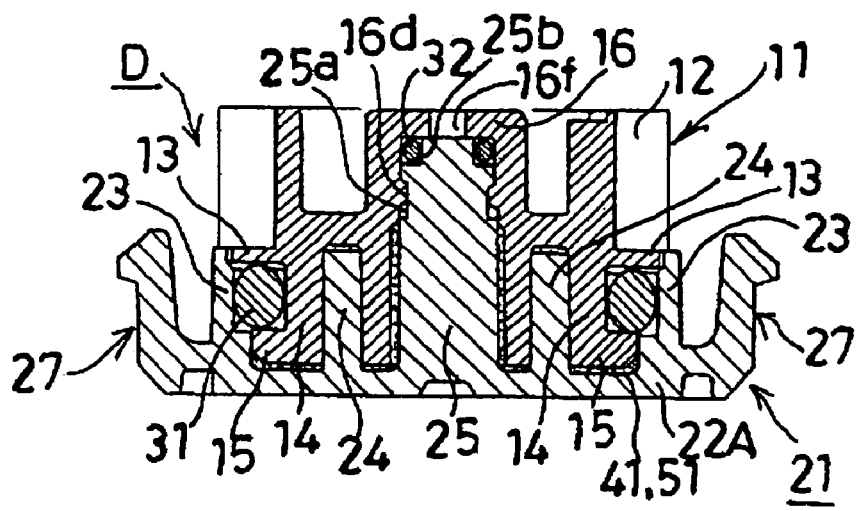
FIG. 12 is a front sectional view of the state in which the respective parts shown in FIG. 11 were assembled to make the rotary damper.

FIG. 11 is a disassembled front sectional view of a rotary damper according to a seventh embodiment of the invention, and FIG. 12 is a front sectional view of the state in which the respective parts shown in FIG. 11 were assembled to make the rotary damper. The same reference characters are assigned to the same or comparable parts as in FIG. 1-FIG. 10, and their explanations are omitted.

In FIG. 11 and FIG. 12, D indicates the rotary damper, and it is constituted by: a driven-to-rotate member 11 made of synthetic resin; a fixed support member 21 made of synthetic resin, which holds this driven-to-rotate member 11 to rotate freely; an O-ring 31, for example, suitably formed with silicone rubber or EPDM (ethylene propylene diene monomer rubber), or the like, as a seal means (seal member), which is attached to the driven-to-rotate member 11, and seals the outer perimeter of an annular receiving part 41 which is formed between the driven-to-rotate member 11 and the fixed support member 21, so that the driven-to-rotate member 11 and the fixed support member 21 are capable of relative rotation; an O-ring 32, for example, suitably formed with silicone rubber or EPDM (ethylene propylene diene monomer rubber), or the like, as a seal means (seal member), which seals the space between the inner perimeter of an inner with-bottom cylindrical wall 16 of the driven-to-rotate member 11 and the outer perimeter of a center shaft 25 of the fixed support member 21 which is inserted inside this inner with-bottom cylindrical wall 16, so that the driven-to-rotate member 11 and the fixed support member 21 are capable of relative rotation; and a viscous fluid 51 such as grease or silicone oil, which is received inside the receiving part 41 formed between the driven-to-rotate member 11 and the fixed support member 21, and damps relative rotation of the driven-to-rotate member 11 and the fixed support member 21.

The above driven-to-rotate member 11, for example, is constituted by: a gear part 12 as a driven-to-rotate part which couples to a drive member such as a gear or a rack; a holding flange part 13 which is integrally provided beneath this gear part 12; an outer cylindrical wall 14 which is integrally provided beneath the holding flange part 13 centered on the center of the gear part 12; a holding flange part 15 which is integrally provided being placed opposite to the holding flange part 13 on the outer perimeter of the lower end of this outer cylindrical wall 14, and holds the O-ring 31 between it and the holding flange part 13 on the outer perimeter of the outer cylindrical wall 14; and an inner with-bottom cylindrical wall 16 having a raised bottom, as an inner cylindrical wall which is integrally provided on the gear part 12 centered on the center of the gear part 12, runs through vertically inside the outer cylindrical wall 14, and communicates with the receiving part 41.

Also, on the inner with-bottom cylindrical wall 16, there are integrally provided: grooves 16c, for example six at equal intervals of 60°, which extend from the lower end on the inner perimeter to the middle part in the vertical direction; and coupling projections 16d, which are positioned above these grooves 16c, and form complementary coupling parts capable of relative rotation with a locking circumferential groove 25a of the fixed support member 21 to be described later, and have the upper ends made as flat surfaces and have the lower sides made as sloping surfaces which spread outward as they go downward, and for example are positioned in the circumferential direction at a 180° interval; and on the raised bottom which functions as a pressing projection, a hole 16f is provided in the center.

The inner with-bottom cylindrical wall 16 is made with a length such that the upper side of the center shaft 25 of the fixed support member 21 contacts with the lower surface of the raised bottom when the driven-to-rotate member 11 and the fixed support member 21 are assembled.

Also, the raised bottom of the inner with-bottom cylindrical wall 16 functions as a pressing projection which presses the O-ring 32.

Next, one example of assembly of the rotary damper D is explained.

First, as shown in FIG. 11, the fixed support member 21 is placed on top of a work table, and a prescribed quantity of viscous fluid 51 is poured into the annular recess formed between the outer cylindrical wall 23 and the inner cylindrical wall 24.

Also, after the O-ring 32 is positioned on the circumferential step part 25b of the center shaft 25, the lower side of the driven-to-rotate member 11, with the O-ring 31 being held on the outside of the outer cylindrical wall 14 by the two holding flange parts 13 and 15, is inserted into the fixed support member 21 with the insertion of the center shaft 25 into the inner with-bottom cylindrical wall 16 as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance through the grooves 16c into the space between the inner with-bottom cylindrical wall 16 and the center shaft 25.

By the fact that the air moves faster than the viscous fluid 51, it passes between the outer cylindrical wall 14 and the inner cylindrical wall 24, between the inner with-bottom cylindrical wall 16 and the inner cylindrical wall 24, and between the inner with-bottom cylindrical wall 16 and the center shaft 25 from the grooves 16c, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, and the O-ring 31 seals the space between the outer cylindrical wall 23 and the outer cylindrical wall 14 so that the driven-to-rotate member 11 and the fixed support member 21 are capable of relative rotation.

Also, the center shaft 25 rides over the coupling projections 16d and advances into the inner with-bottom cylindrical wall 16, whereby the coupling projections 16d stick into the locking circumferential groove 25a, and the coupling projections 16d, as shown in FIG. 12, couple to the locking circumferential groove 25a.

Also, the raised bottom (pressing projection) of the inner with-bottom cylindrical wall 16 holds the O-ring 32 so that it is prevented from coming out from between the inner with-bottom cylindrical wall 16 and the center shaft 25, and the assembly (construction) is finished.

Because the operation of the rotary damper D in this seventh embodiment becomes the same as in the first embodiment, the explanation is omitted.

By the seventh embodiment of this invention, the same kind of effect as in the first embodiment can be obtained.

Also, the coupling means for coupling the driven-to-rotate member 11 and the fixed support member 21 to be capable of relative rotation in this embodiment also may have the constitution of the embodiment in FIG. 3 or FIG. 4.

Figure 13:
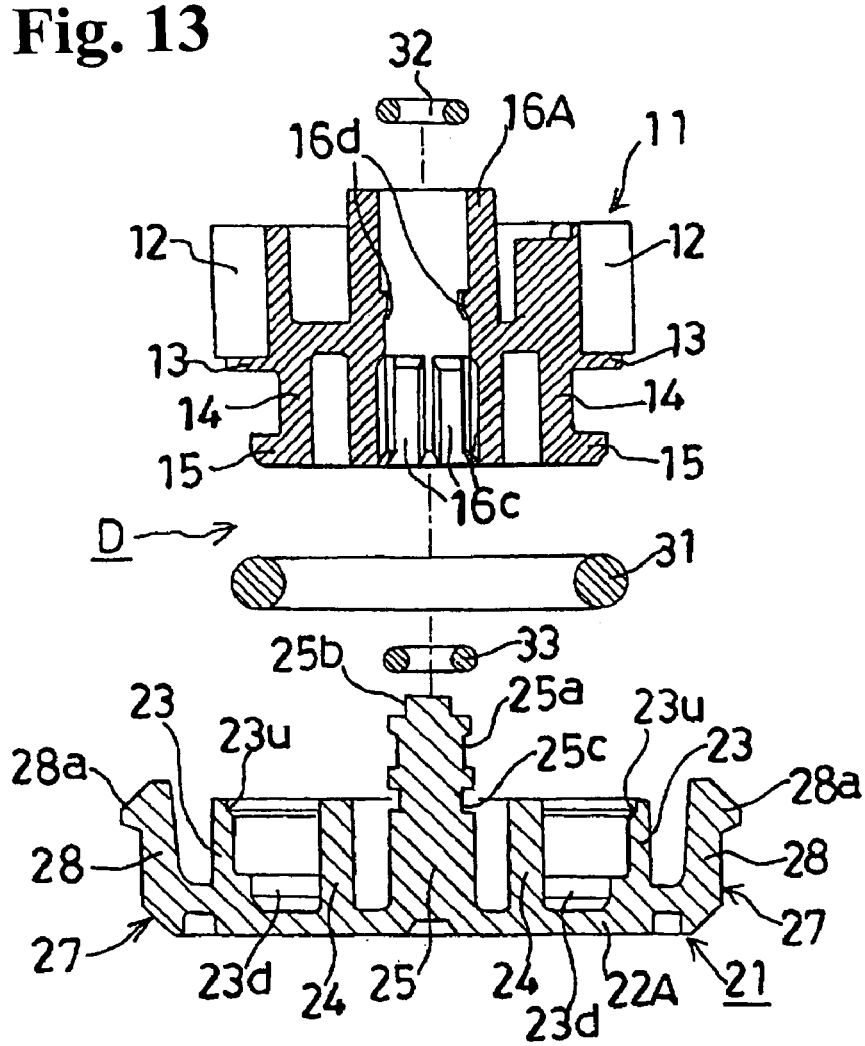
FIG. 13 is a disassembled front sectional view of a rotary damper according to an eighth embodiment of the invention.
Figure 14:
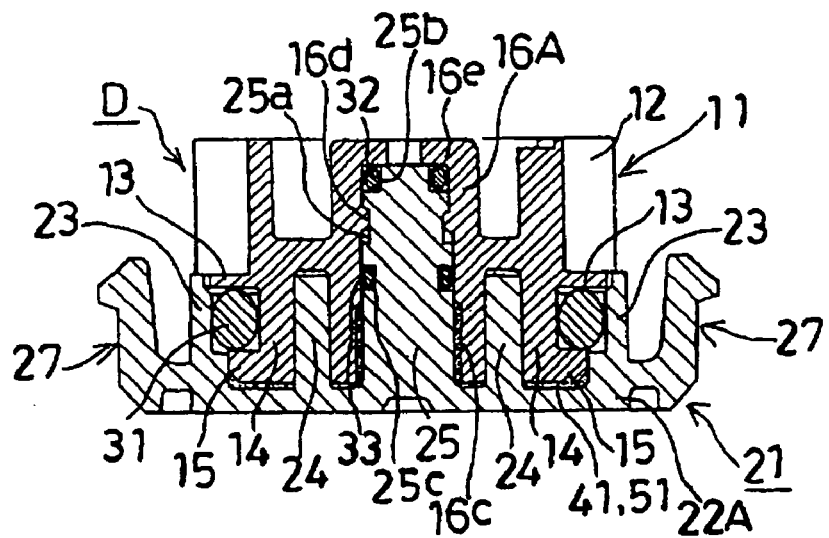
FIG. 14 is a front sectional view of the state in which the respective parts shown in FIG. 13 were assembled to make the rotary damper.

FIG. 13 is a disassembled front sectional view of a rotary damper according to an eighth embodiment of the invention, and FIG. 14 is a front sectional view of the state in which the respective parts shown in FIG. 13 were assembled to make the rotary damper. The same reference characters are assigned to the same or comparable parts as in FIG. 1-FIG. 12, and their explanations are omitted.

In FIG. 13 and FIG. 14, D indicates the rotary damper, and it is constituted by: a driven-to-rotate member 11 made of synthetic resin; a fixed support member 21 made of synthetic resin, which holds this driven-to-rotate member 11 to rotate freely; an O-ring 31, for example, suitably formed with silicone rubber or EPDM (ethylene propylene diene monomer rubber), or the like, as a seal means (seal member), which is attached to the driven-to-rotate member 11, and seals the outer perimeter of an annular receiving part 41 which is formed between the driven-to-rotate member 11 and the fixed support member 21, so that the driven-to-rotate member 11 and the fixed support member 21 are capable of relative rotation; O-rings 32 and 33, for example, suitably formed with silicone rubber or EPDM (ethylene propylene diene monomer rubber), or the like, as seal means (seal members), which seal the space between the inner perimeter of an inner cylindrical wall 16A of the driven-to-rotate member 11 and the outer perimeter of a center shaft 25 of the fixed support member 21 which is inserted inside this inner cylindrical wall 16A, so that the driven-to-rotate member 11 and the fixed support member 21 are capable of relative rotation; and a viscous fluid 51 such as grease or silicone oil, which is received inside the receiving part 41 formed between the driven-to-rotate member 11 and the fixed support member 21, and damps relative rotation of the driven-to-rotate member 11 and the fixed support member 21.

The above driven-to-rotate member 11, for example, is constituted by: a gear part 12 as a driven-to-rotate part which couples to a drive member such as a gear or a rack; a holding flange part 13 which is integrally provided beneath this gear part 12; an outer cylindrical wall 14 which is integrally provided beneath the holding flange part 13 centered on the center of the gear part 12; a holding flange part 15 which is integrally provided being placed opposite to the holding flange part 13 on the outer perimeter of the lower end of this outer cylindrical wall 14, and holds the O-ring 31 between it and the holding flange part 13 on the outer perimeter of the outer cylindrical wall 14; and an inner cylindrical wall 16A which is integrally provided on the gear part 12 centered on the center of the gear part 12, runs through vertically inside the outer cylindrical wall 14, and has an opening that communicates with the receiving part 41.

Also, on the inner perimeter of the inner cylindrical wall 16A, there are integrally provided: grooves 16c, for example six at equal intervals of 60°, which extend in the vertical direction from the lower end to a part becoming lower than a circumferential receiving groove 25c of the fixed support member 21 to be described later; and coupling projections 16d, which are positioned above these grooves 16c, and form complementary coupling parts capable of relative rotation with a locking circumferential groove 25a of the fixed support member 21 to be described later, and have the upper ends made as flat surfaces and have the lower sides made as sloping surfaces which spread outward as they go downward, and for example are positioned in the circumferential direction at a 180° interval.

The inner cylindrical wall 16A is made with a length that projects a prescribed length above the center shaft 25 of the fixed support member 21 when the driven-to-rotate member 11 and the fixed support member 21 are assembled.

Also, the upper end part of the inner cylindrical wall 16A is caused to be deformed by heat inward as described later to become a come-out prevention part 16e, which prevents the O-ring 32 from coming out from between the inner cylindrical wall 16A and the center shaft 25.

The above-mentioned fixed support member 21 is constituted by: a bottom wall 22A having a circular shape viewed as a plane; an outer cylindrical wall 23 which is integrally provided on the outside edge of this bottom wall 22A; an inner cylindrical wall 24 which is provided on the bottom wall 22A concentrically with the outer cylindrical wall 23, and is inserted into an annular groove formed by the outer cylindrical wall 14 and the inner cylindrical wall 16A of the driven-to-rotate member 11; a center shaft 25 which is integrally provided in the center of the bottom wall 22A and is inserted into the inner cylindrical wall 16A of the driven-to-rotate member 11; and attachment parts 27 which are integrally provided, for example at a 180° interval, on the outer perimeter of the bottom wall 22A.

Also, on the center shaft 25, there is provided a locking circumferential groove 25a having the upper end made as a flat surface, which forms a complementary coupling part capable of relative rotation with the coupling projection 16d of the driven-to-rotate member 11, to the height of the outer perimeter corresponding to the coupling projection 16d of the driven-to-rotate member 11, and on the outside of the upper end, there is provided a circumferential step part 25b as a receiving part for receiving the O-ring 32, and on the outer perimeter lower than the locking circumferential groove 25a, there is provided a circumferential receiving part 25c as a receiving part for receiving the O-ring 33.

Next, one example of assembly of the rotary damper D is explained.

First, as shown in FIG. 13, the fixed support member 21 is placed on top of a work table, and a prescribed quantity of viscous fluid 51 is poured into the annular recess formed between the outer cylindrical wall 23 and the inner cylindrical wall 24.

Also, after the O-ring 33 is installed in the circumferential receiving groove 25c of the center shaft 25, the lower side of the driven-to-rotate member 11, with the O-ring 31 being held on the outside of the outer cylindrical wall 14 by the two holding flange parts 13 and 15, is inserted into the fixed support member 21 with the insertion of the center shaft 25 into the inner cylindrical wall 16A as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance through the grooves 16c into the space between the inner cylindrical wall 16A and the center shaft 25.

By the fact that the air moves faster than the viscous fluid 51, it passes between the outer cylindrical wall 14 and the inner cylindrical wall 24, between the two inner cylindrical walls 16A and 24, and between the inner cylindrical wall 16A and the center shaft 25 from the grooves 16c, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, and the O-ring 31 seals the space between the outer cylindrical wall 23 and the outer cylindrical wall 14 so that the driven-to-rotate member 11 and the fixed support member 21 are capable of relative rotation.

Also, the center shaft 25 rides over the coupling projections 16d and advances into the inner cylindrical wall 16A, whereby the coupling projections 16d extend into the locking circumferential groove 25a, and the coupling projections 16d, as shown in FIG. 14, couple to the locking circumferential groove 25a.

Also, the O-ring 32 is inserted from above into the inner cylindrical wall 16A, and the O-ring 32 is positioned inside the circumferential step part 25b.

In this state, for example, a heat tip heated by passing electric current is pressed against the upper side of the inner cylindrical wall 16A to cause it to be deformed inward, and as shown in FIG. 14, the come-out prevention part 16e for preventing the O-ring 32 from coming out from between the inner cylindrical wall 16A and the center shaft 25 is provided, whereby the assembly (construction) is finished.

Because the operation of the rotary damper D in this eighth embodiment becomes the same as in the first embodiment, the explanation is omitted.

By the eighth embodiment of this invention, the same kind of effect as in the first embodiment can be obtained.

Also, the coupling means for coupling the driven-to-rotate member 11 and the fixed support member 21 to be capable of relative rotation in this embodiment also may have the constitution of the embodiment in FIG. 3 or FIG. 4.

Also, either one of the O-rings 32 and 33 for sealing the space between the inner cylindrical wall 16A and the center shaft 25 may be provided; in the case of the O-ring 33, it is desirable that the groove 16c not be provided.

Furthermore, instead of the inner cylindrical wall 16A, it also may be the inner with-bottom cylindrical wall 16 of the embodiments in FIG. 11 and FIG. 12.

Figure 15:
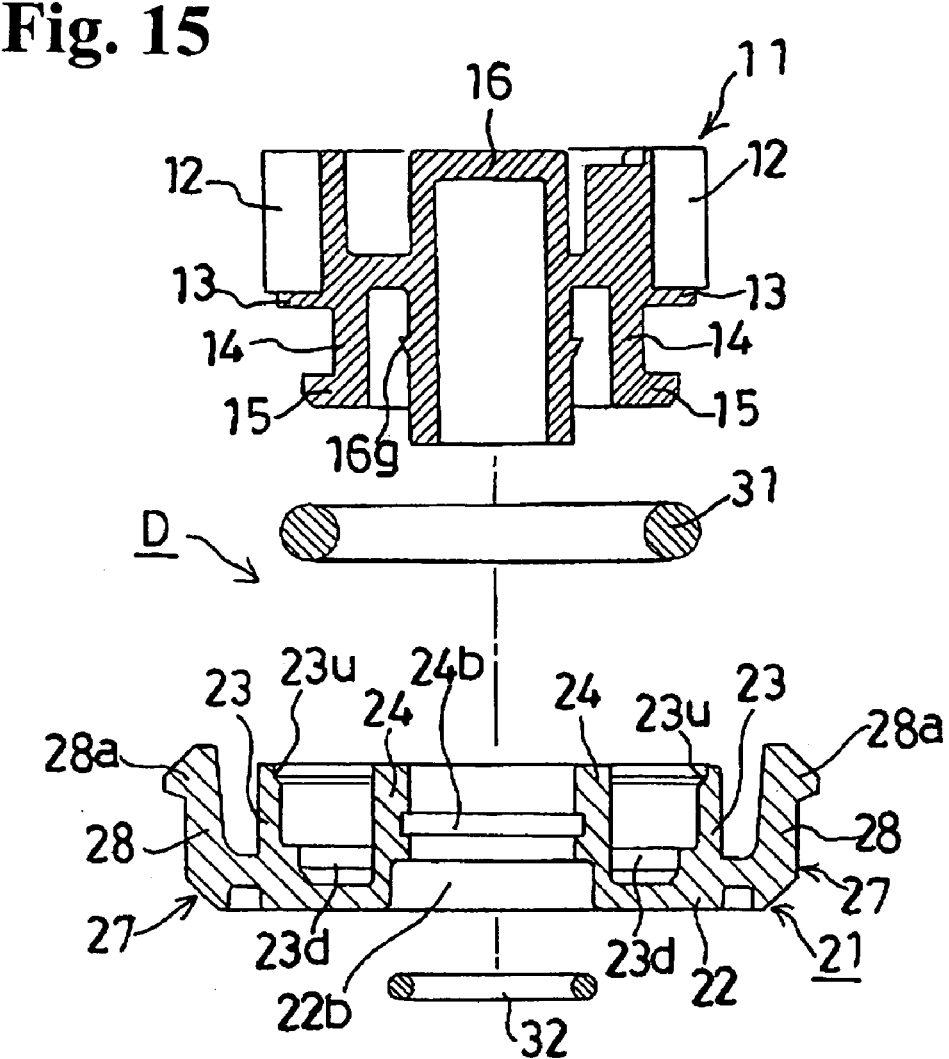
FIG. 15 is a disassembled front sectional view of a rotary damper according to a ninth embodiment of the invention.
Figure 16:
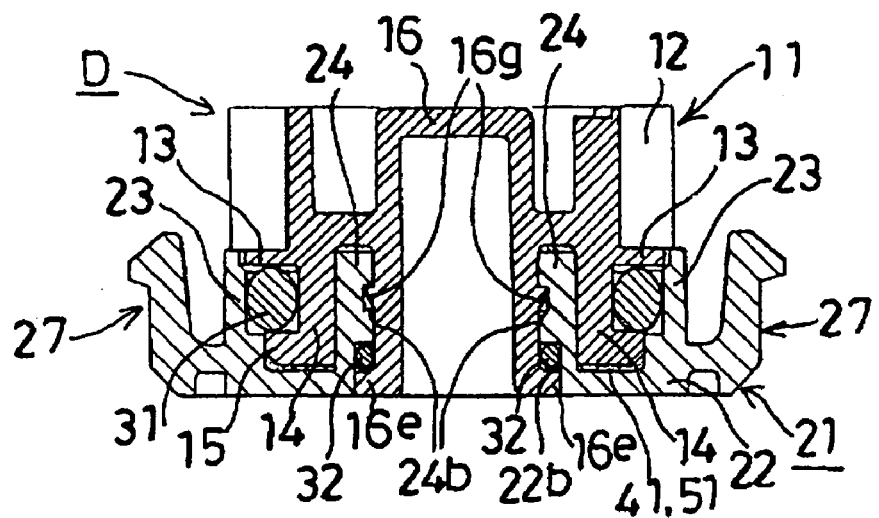
FIG. 16 is a front sectional view of the state in which the respective parts shown in FIG. 15 were assembled to make the rotary damper.

FIG. 15 is a disassembled front sectional view of a rotary damper according to a ninth embodiment of the invention, and FIG. 16 is a front sectional view of the state in which the respective parts shown in FIG. 15 were assembled to make the rotary damper. The same symbols are assigned to the same or comparable parts as in FIG. 1-FIG. 14, and their explanations are omitted.

In FIG. 15 and FIG. 16, D indicates the rotary damper, and it is constituted by: a driven-to-rotate member 11 made of synthetic resin; a fixed support member 21 made of synthetic resin, which holds this driven-to-rotate member 11 to rotate freely; an O-ring 31, for example, suitably formed with silicone rubber or EPDM (ethylene propylene diene monomer rubber), or the like, as a seal means (seal member), which is attached to the driven-to-rotate member 11, and seals the outer perimeter of an annular receiving part 41 which is formed between the driven-to-rotate member 11 and the fixed support member 21, so that the driven-to-rotate member 11 and the fixed support member 21 are capable of relative rotation; an O-ring 32, for example, suitably formed with silicone rubber or EPDM (ethylene propylene diene monomer rubber), or the like, as a seal means (seal member), which seals the space between the outer perimeter of an inner with-bottom cylindrical wall 16 of the driven-to-rotate member 11 and the inner perimeter of an inner cylindrical wall 24 of the fixed support member 21 which is inserted inside this inner with-bottom cylindrical wall 16, so that the driven-to-rotate member 11 and the fixed support member 21 are capable of relative rotation; and a viscous fluid 51 such as grease or silicone oil, which is received inside the receiving part 41 formed between the driven-to-rotate member 11 and the fixed support member 21, and damps relative rotation of the driven-to-rotate member 11 and the fixed support member 21.

The above driven-to-rotate member 11, for example, is constituted by: a gear part 12 as a driven-to-rotate part which couples to a drive member such as a gear or a rack; a holding flange part 13 which is integrally provided beneath this gear part 12; an outer cylindrical wall 14 which is integrally provided beneath the holding flange part 13 centered on the center of the gear part 12; a holding flange part 15 which is integrally provided being placed opposite to the holding flange part 13 on the outer perimeter of the lower end of this outer cylindrical wall 14, and holds the O-ring 31 between it and the holding flange part 13 on the outer perimeter of the outer cylindrical wall 14; and an inner with-bottom cylindrical wall 16 having a raised bottom, as an inner cylindrical wall which is integrally provided on the gear part 12 centered on the center of the gear part 12, and runs through vertically inside the outer cylindrical wall 14, and has an opening that communicates with the receiving part 41.

Also, on the outer perimeter on the lower side of the inner with-bottom cylindrical wall 16, there are integrally provided coupling projections 16g, which form complementary coupling parts capable of relative rotation with a locking circumferential groove 24b of the fixed support member 21 to be described later, and have the upper ends made as flat surfaces and have the lower sides made as sloping surfaces which descend downward as they go inward.

The inner with-bottom cylindrical wall 16 is made with a length that projects a prescribed length beneath a bottom wall 22 of the fixed support member 21 when the driven-to-rotate member 11 and the fixed support member 21 are assembled.

Also, the lower end part of the inner with-bottom cylindrical wall 16 is caused to be deformed by heat toward the inside of a circumferential recess 22b as described later to become a locking part 16e, and this locking part 16e, together with the circumferential recess 22b, constitutes a coupling part for coupling the driven-to-rotate member 11 and the fixed support member 21 to be capable of relative rotation.

The above-mentioned fixed support member 21 is constituted by: a bottom wall 22 having a round ring shape viewed as a plane; an outer cylindrical wall 23 which is integrally provided on the outside edge of this bottom wall 22; an inner cylindrical wall 24 which is provided on the inside edge of the bottom wall 22 concentrically with the outer cylindrical wall 23, and is inserted into an annular groove formed by the outer cylindrical wall 14 and the inner with-bottom cylindrical wall 16 of the driven-to-rotate member 11; and attachment parts 27 which are integrally provided, for example at a 180° interval, on the outer perimeter of the bottom wall 22.

Also, on the bottom wall 22, a circumferential recess 22b, which constitutes a coupling part for coupling the driven-to-rotate member 11 and the fixed support member 21 to be capable of relative rotation, is provided on the outside of the bottom wall 22, centered on the center of the inner cylindrical wall 24 (center of the bottom wall 22), in a state reaching up to the inner cylindrical wall 24.

Also, on the inner perimeter of the inner cylindrical wall 24, there is provided a locking circumferential groove 24b having the upper end made as a flat surface, which forms a complementary coupling part capable of relative rotation with the coupling projections 16g of the driven-to-rotate member 11, to a height corresponding to the coupling projections 16g of the driven-to-rotate member 11.

Next, one example of assembly of the rotary damper D is explained.

First, as shown in FIG. 15, the fixed support member 21 is placed on top of a work table, and a prescribed quantity of viscous fluid 51 is poured into the annular recess formed between the outer cylindrical wall 23 and the inner cylindrical wall 24.

Also, the lower side of the driven-to-rotate member 11, with the O-ring 31 being held on the outside of the outer cylindrical wall 14 by the two holding flange parts 13 and 15, is inserted into the fixed support member 21 with the insertion of the inner with-bottom cylindrical wall 16 into the inner cylindrical wall 24 as a guide.

When the lower side of the driven-to-rotate member 11 thus is inserted into the fixed support member 21, because the outer perimeter of the receiving part 41 formed by the driven-to-rotate member 11 and the fixed support member 21 is sealed by the O-ring 31, the viscous fluid 51 and air move from the outside to the inside between the driven-to-rotate member 11 and the fixed support member 21, while being compressed by the driven-to-rotate member 11 and the fixed support member 21, and they advance into the space between the outer cylindrical wall 14 and the inner cylindrical wall 24.

By the fact that the air moves faster than the viscous fluid 51, it passes between the inner with-bottom cylindrical wall 16 and the inner cylindrical wall 24 from between the outer cylindrical wall 14 and the inner cylindrical wall 24, and is discharged to the outside, and the air no longer remains inside the receiving part 41.

When the lower side of the driven-to-rotate member 11 is inserted into the fixed support member 21 in the above manner, the holding flange part 15 is inserted inside the outer cylindrical wall 23 (inside the lower step part 23d) to be capable of rotation, and the O-ring 31 seals the space between the outer cylindrical wall 23 and the outer cylindrical wall 14 so that the driven-to-rotate member 11 and the fixed support member 21 are capable of relative rotation.

Also, the inner cylindrical wall 24 rides over the coupling projections 16g and the inner with-bottom cylindrical wall 16 advances into the inner cylindrical wall 24, whereby the coupling projections 16g extend into the locking circumferential groove 24b, and the coupling projections 16g, as shown in FIG. 16, couple to the locking circumferential groove 24b.

In this state, for example, a heat tip heated by passing electric current is pressed against the lower side of the inner with-bottom cylindrical wall 16 to cause it to be deformed outward, and as shown in FIG. 16, a come-out prevention part 16e for preventing the O-ring 32 from coming out from between the inner with-bottom cylindrical wall 16 and the inner perimeter wall 24 is provided, whereby the assembly (construction) is finished.

Because the operation of the rotary damper D in this ninth embodiment becomes the same as in the first embodiment, the explanation is omitted.

By the ninth embodiment of this invention, the same kind of effect as in the first embodiment can be obtained.

Also, because the come-out prevention part 16e can be provided by causing the lower side of the inner with-bottom cylindrical wall 16 to be deformed by heat in a state in which the coupling projections 16g are coupled to the locking circumferential groove 24b, the work of providing the come-out prevention part 16e by causing the lower side of the inner with-bottom cylindrical wall 16 to be deformed by heat can be performed with good workability.

Also, the coupling means for coupling the driven-to-rotate member 11 and the fixed support member 21 to be capable of relative rotation in this embodiment also may have the constitution of the embodiment in FIG. 3 or FIG. 4.

Figure 17:
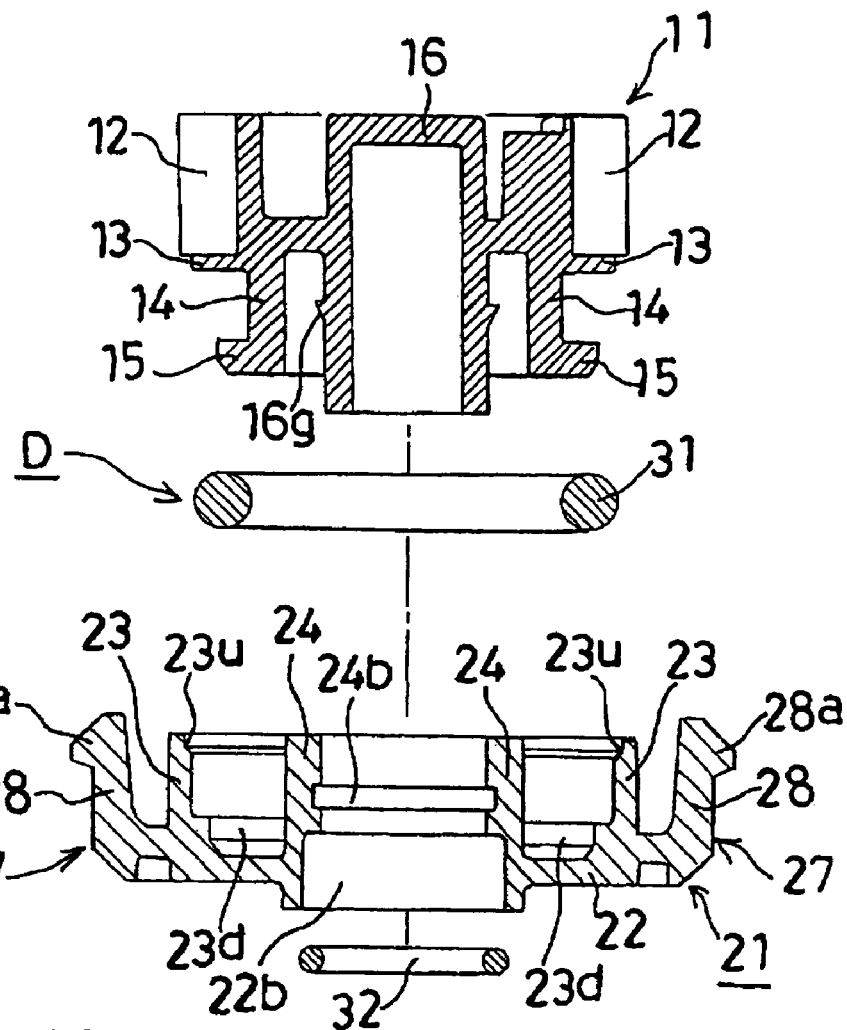
FIG. 17 is a disassembled front sectional view of a rotary damper according to a tenth embodiment of the invention.
Figure 18:
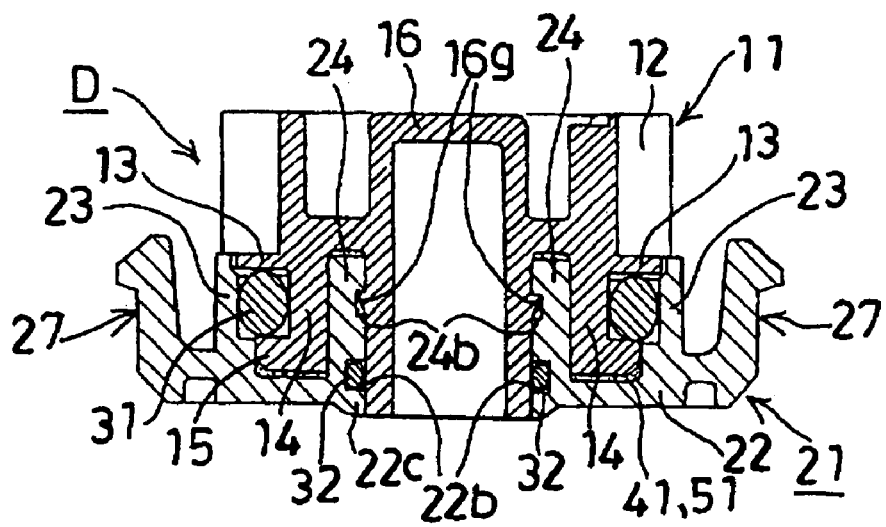
FIG. 18 is a front sectional view of the state in which the respective parts shown in FIG. 17 were assembled to make the rotary damper.

FIG. 17 is a disassembled front sectional view of a rotary damper according to a tenth embodiment of the invention, and FIG. 18 is a front sectional view of the state in which the respective parts shown in FIG. 17 were assembled to make the rotary damper. The same reference characters are assigned to the same or comparable parts as in FIG. 1-FIG. 16, and their explanations are omitted.

The rotary damper D of this tenth embodiment is constituted the same as in the eighth embodiment, except for the point that the come-out prevention part 22c, which is provided by causing to be deformed by heat in order to prevent the O-ring 32 from coming out, is provided on the fixed support member 21.

Because one example of assembly in this tenth embodiment becomes the same as in the ninth embodiment, its explanation is omitted.

Also, because the operation in this tenth embodiment becomes the same as in the first embodiment, the explanation is omitted.

By this tenth embodiment, the same kind of effect as in the first embodiment can be obtained.

Also, the coupling means for coupling the driven-to-rotate member 11 and the fixed support member 21 to be capable of relative rotation in this embodiment also may have the constitution of the embodiment in FIG. 3 or FIG. 4.

Also, the come-out prevention part, which is provided by causing to be deformed by heat in order to prevent the O-ring 32 from coming out, may be provided on at least one of the inner cylindrical wall of the driven-to-rotate member 11 and the bottom wall of the fixed support member 21.

In the above embodiment, between the coupling projections and the locking circumferential groove which constitute complementary coupling parts, the places on which they are provided may be switched mutually.

While the invention has been described with reference to specific embodiments thereof, the description is illustrative, and the scope of the present invention is limited only by the appended claims.

The disclosure of Japanese Patent Application No. 2004-346493 filed on Nov. 30, 2004, is incorporated herein.

What is claimed is:

1. A rotary damper, comprising:
a driven-to-rotate member having integrally a driven-to-rotate part for coupling to a drive member, a first inner cylindrical wall, a first outer cylindrical wall situated outside the first inner cylindrical wall with a space therebetween, and first and second holding flange parts extending radially outwardly from the first outer cylindrical wall with a space therebetween, said second holding flange part being located lower than the first holding flange part and having a radial length less than that of the first holding flange part;

a fixed support member for holding said driven-to-rotate member so as to rotate freely, said fixed support member having a second inner cylindrical wall inserted between the first inner cylindrical wall and the first outer cylindrical wall so as to be capable of relative rotation, a second outer cylindrical wall disposed outside the second inner cylindrical wall, and a step projecting toward the second inner cylindrical wall from a lower part of the second outer cylindrical wall so that the first holding flange faces the second outer cylindrical wall and said second holding flange faces the step;

a receiving part formed between said second inner cylindrical wall and the step at the fixed support member;

an O-ring as seal means disposed under the first holding flange part and above the second holding flange part and the step, for sealing an outer perimeter of said receiving part so that said driven-to-rotate member and said fixed support member are capable of relative rotation; and a viscous fluid received inside said receiving part for damping relative rotation between said driven-to-rotate member and said fixed support member.

2. A rotary damper according to claim 1, wherein said first and second inner cylindrical walls include first and second engaging means engaging each other, respectively, so that when the driven-to-rotate member is assembled with the fixed support member, the first and second engaging means engage together to rotationally hold the driven-to-rotate member and the fixed support member.

3. A rotary damper according to claim 1, wherein said O-ring is formed of silicone rubber or ethylene propylene diene monomer rubber.

4. A rotary damper according to claim 1, wherein said viscous fluid is grease or silicone oil.

5. A rotary damper according to claim 1, wherein said second outer cylindrical wall includes an upper step part for rotationally receiving the first holding flange part.

6. A rotary damper according to claim 5, wherein said first inner cylindrical wall is located inside the second inner cylindrical wall without receiving a part of the fixed support member inside the first inner cylindrical wall.

7. A rotary damper according to claim 1, wherein said second outer cylindrical wall includes coupling claws projecting inwardly therefrom and engaging the first holding flange part.

8. A rotary damper according to claim 1, wherein said first holding flange includes a coupling claw, and the second outer cylindrical wall includes a circumferential locking part engaging the coupling claw.

9. A rotary damper according to claim 1., wherein said fixed support member further includes a center shaft disposed inside the first inner cylindrical wall, and a second O-ring disposed around the center shaft to seal between the center shaft and the first inner cylindrical wall.

* * * * *